United States Patent
Yae (10) Patent No.: US 9,468,027 B2
(45) Date of Patent: *Oct. 11, 2016

(54) METHOD FOR CONTROLLING A BLUETOOTH CONNECTION

(71) Applicants: Hyundai Motor Company, Seoul (KR); Kia Motors Corporation, Seoul (KR)

(72) Inventor: Seong Soo Yae, Osan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 10 days.

This patent is subject to a terminal disclaimer.

(21) Appl. No.: 14/507,505

(22) Filed: Oct. 6, 2014

(65) Prior Publication Data

US 2015/0327319 A1 Nov. 12, 2015

(30) Foreign Application Priority Data

May 8, 2014 (KR) ........................ 10-2014-0055032

(51) Int. Cl.
| | |
|---|---|
| *H04B 7/00* | (2006.01) |
| *H04W 76/02* | (2009.01) |
| *H04M 1/60* | (2006.01) |
| *H04W 76/06* | (2009.01) |

(52) U.S. Cl.
CPC ........... *H04W 76/02* (2013.01); *H04M 1/6091* (2013.01); *H04W 76/028* (2013.01); *H04W 76/06* (2013.01)

(58) Field of Classification Search
USPC .............. 455/41.2, 16, 550.1, 411, 419, 517, 455/569.2, 414.1, 573, 13.1
See application file for complete search history.

(56) References Cited

U.S. PATENT DOCUMENTS

| | | | |
|---|---|---|---|
| 2002/0028655 A1* | 3/2002 | Rosener | H04B 7/2606 455/16 |
| 2004/0264387 A1 | 12/2004 | Gibeau | |
| 2008/0039018 A1 | 2/2008 | Kim | |
| 2009/0124281 A1* | 5/2009 | Takamune | H04M 1/6066 455/550.1 |
| 2011/0105082 A1* | 5/2011 | Haley | H04M 1/72577 455/411 |
| 2011/0177780 A1* | 7/2011 | Sato | H04W 36/14 455/41.1 |
| 2012/0071096 A1* | 3/2012 | Matsushita | H04M 1/6075 455/41.2 |
| 2013/0165046 A1* | 6/2013 | Tang | H04B 7/00 455/41.2 |
| 2013/0260690 A1* | 10/2013 | Cha | H04B 7/26 455/41.2 |

FOREIGN PATENT DOCUMENTS

| | | |
|---|---|---|
| KR | 2002-0044892 A | 6/2002 |
| KR | 10-2008-0013434 A | 2/2008 |

(Continued)

*Primary Examiner* — Ganiyu A Hanidu
(74) *Attorney, Agent, or Firm* — McDermott Will & Emery LLP (57) ABSTRACT

A method for controlling a Bluetooth connection includes connecting a terminal with a vehicle through a Bluetooth connection. The Bluetooth connection is disconnected according to a disconnection request of the terminal. It is automatically determined whether a Bluetooth communication of the terminal is available or not in the vehicle, when the disconnection of the Bluetooth connection is detected. The Bluetooth connection is requested again from the vehicle to the terminal, when the response indicating the Bluetooth communication is available is received from the terminal. The vehicle and the terminal are connected by requesting the Bluetooth connection again.

1 Claim, 6 Drawing Sheets (56) References Cited

FOREIGN PATENT DOCUMENTS

| KR | 10-2008-0045525 A | 5/2008 |
| KR | 10-2009-0058618 A | 6/2009 |
| KR | 10-2012-0006374 A | 1/2012 |
| KR | 10-2012-0017683 A | 2/2012 |
| KR | 10-2013-0019916 A | 2/2013 |
| KR | 10-2013-0110789 A | 10/2013 |
| KR | 10-2014-0052230 A | 5/2014 |

* cited by examiner

METHOD FOR CONTROLLING A BLUETOOTH CONNECTION

CROSS-REFERENCE TO RELATED APPLICATION

This application is based on and claims benefit of priority to Korean Patent Application No. 10-2014-0055032, filed on May 8, 2014 in the Korean Intellectual Property Office, the entire content of which is incorporated herein by reference.

TECHNICAL FIELD

The present inventive concept relates to a method for controlling a Bluetooth connection, and more particularly, a method for automatically performing a Bluetooth connection, when the Bluetooth connection between a vehicle and a terminal is disconnected.

BACKGROUND

Since the phone call while driving may distract the driver, in order to prevent this, the hands-free phone call has been widely used for enabling the driver to concentrate on driving without the use of hands.

Early hands-free device is wired and mounted on a mobile phone holder, but in recent years, the product, in which Bluetooth technology is applied so that the phone call is possible even while leaving the mobile phone in a bag or pocket, has gained popularity.

Bluetooth is the technology according to the specification of the IEEE 802.15.1 short-range wireless communication technology, and it allows the electronic devices, such as a wireless terminal located within about 10 m, for example, a computer, a cell phone, a headset, a PDA, a printer, a mouse, a keyboard and the like, to wirelessly communicate with each other in a low cost and low power.

General Bluetooth hands-free devices output the audio signal transmitted from the paired mobile phone or MP3 player through the speaker provided in a vehicle, and transmit the user's voice signal inputted through the microphone provided in a vehicle to the mobile phone when call function of the mobile phone is used.

Conventional Bluetooth specification was defined so that a Bluetooth device connects when the request for the connection is received and disconnects when the request for releasing the connection. On the basis of this specification, in most cases, the Bluetooth connectivity is maintained in the disconnected state when it is disconnected due to an error of one of devices and there is a problem that it is not reconnected. Also, in the process of applying the Bluetooth technology to a vehicle, the problem that a Bluetooth device is disconnected but not reconnected frequently occurred and this problem causes customer dissatisfaction.

SUMMARY

The object of the present inventive concept is to provide a method for controlling a Bluetooth connection, in which a user can use the Bluetooth function while driving at any time by preventing occurrence of the situation in which a user cannot use the Bluetooth function due to unanticipated Bluetooth disconnection such as an erroneous operation of the head unit, an erroneous operation of the terminal, a mal-operation of the user and the like.

One aspect of the present inventive concept relates to a method for controlling a Bluetooth connection, including steps of connecting a terminal with a vehicle through a Bluetooth connection, disconnecting the Bluetooth connection according to a disconnection request of the terminal, automatically determining whether a Bluetooth communication of the terminal is available or not in the vehicle, when the disconnection of the Bluetooth connection is detected, requesting the Bluetooth connection again from the vehicle to the terminal, when a response indicating the Bluetooth communication is available is received from the terminal, and connecting the vehicle and the terminal by requesting the Bluetooth connection again.

Another aspect of the present inventive concept encompasses a method for controlling a Bluetooth connection including manually requesting a Bluetooth connection of a vehicle and a terminal by a user of the vehicle, disconnecting the Bluetooth connection of the vehicle and the terminal when the requested Bluetooth connection is not established, automatically determining whether a Bluetooth communication of the terminal is available or not in the vehicle, when the Bluetooth connection is detected, requesting the Bluetooth connection again from the vehicle to the terminal, when a response indicating that the Bluetooth communication is available is received from the terminal, and connecting the vehicle and the terminal by requesting the Bluetooth connection again.

Still another aspect of the present inventive concept relates to a method for controlling a Bluetooth connection including connecting a terminal with a vehicle through a Bluetooth connection, changing a multimedia mode of the vehicle from a Bluetooth connection mode to a radio receiving mode or a terminal registration mode for the Bluetooth connection, disconnecting the Bluetooth connection according to the change, automatically determining whether a Bluetooth communication of the terminal is available or not in the vehicle, when the disconnection of the Bluetooth connection is detected, requesting the Bluetooth connection again from the vehicle to the terminal, when a response indicating that the Bluetooth communication is available is received from the terminal, and connecting the vehicle and the terminal by requesting the Bluetooth connection again.

Still another aspect of the present inventive concept relates to a method for controlling a Bluetooth connection including connecting a terminal with a vehicle through a Bluetooth connection, deleting the terminal from a terminal list registered in the vehicle for the Bluetooth connection, disconnecting the Bluetooth connection according to the deletion, automatically determining whether a Bluetooth communication of the terminal is available or not in the vehicle, when the disconnection of the Bluetooth connection is detected, requesting the Bluetooth connection again from the vehicle to the terminal, when a response indicating that the Bluetooth communication is available is received from the terminal, and connecting the vehicle and the terminal by requesting the Bluetooth connection again.

In automatically determining whether a Bluetooth communication of the terminal is available or not, it may be determined whether the Bluetooth communication is available or not to a previous terminal which has been connected immediately before the disconnecting of the Bluetooth connection, and when the Bluetooth connection between the previous terminal and the vehicle is not established, it may be determined whether the Bluetooth communication is available from a highest priority terminal of terminals registered in a terminal registration mode for the Bluetooth connection of the vehicle in order of priority.

In automatically determining whether a Bluetooth communication of the terminal is available or not, it may be determined whether the Bluetooth communication is available from a highest priority terminal of terminals registered in a terminal registration mode for the Bluetooth connection of the vehicle in order of priority, when the terminal is deleted in a terminal list registered in the vehicle, it may be determined whether the Bluetooth communication is available or not to a previous terminal which has been connected immediately before the disconnecting of the Bluetooth connection, when the terminal is not deleted in a terminal list registered in the vehicle, and it may be determined whether the Bluetooth communication is available from the highest priority terminal of terminals registered in the terminal registration mode for the Bluetooth connection of the vehicle in order of priority, when the Bluetooth connection of the previous terminal and the vehicle is not established.

Still another aspect of the present inventive concept relates to a method for controlling a Bluetooth connection including requesting a Bluetooth connection to a terminal list registered in a vehicle for the Bluetooth connection, in a state in which the Bluetooth connection of the vehicle and the terminal is disconnected, attempting the Bluetooth connection by repeating the request twice or more, when the Bluetooth connection is not established, resetting a Bluetooth module provided in the vehicle, when the Bluetooth connection is not established even after the repeating of the request, attempting the Bluetooth connection by repeating the request twice or more, after the resetting of the Bluetooth module, and providing a user of the vehicle with a message requesting to confirm a Bluetooth activation state of the terminal on a display device provided in the vehicle, when the Bluetooth connection is not established even after the repeating of the request.

In requesting the Bluetooth connection to the terminal list registered in the vehicle, the Bluetooth connection may be requested from a highest priority terminal of registered terminals in order of priority by requesting the Bluetooth connection to each of the terminals one by one according to the priority and by eliminating duplicate attempts of the Bluetooth connection request.

The method for controlling a Bluetooth connection according to the present inventive concept can use the Bluetooth function while driving at any time by preventing occurrence of the situation in which a user cannot use the Bluetooth function due to an unanticipated Bluetooth disconnection such as an erroneous operation of the head unit, an erroneous operation of the terminal, a mal-operation of the user and the like.

BRIEF DESCRIPTION OF THE DRAWINGS

The above and other objects, features and advantages of the present inventive concept will be more apparent from the following detailed description taken in conjunction with the accompanying drawings.

DETAILED DESCRIPTION OF THE PREFERRED EMBODIMENTS

The advantage and features of the present inventive concept and how to achieve it will be explained through embodiments described in detail with the accompanying drawings. However, the inventive concept is not limited to embodiments described herein and may be embodied in other aspects. Only, the present embodiment is provided for explaining to those skilled in the art to which this inventive concept pertains in detail to the extent that it is possible to easily embody the technical spirit of the present inventive concept.

In the drawings, embodiments of the present inventive concept are not limited to the shown specific aspects and are exaggerated in order to clarify. Although specific terms are used herein, it is only used for explaining the present inventive concept, and it is not used for limiting the meaning or the scope of the present inventive concept described in the claims.

The expression "and/or" herein is used as the meaning including at least one of components listed before and after the expression. Also, the expression "connected/coupled" is used as the meaning including being directly connected with another component or indirectly connected through another component. A singular form herein also includes a plural form unless it is specially referred in a phrase. Also, the components, steps, operations and elements referred as "comprise" or "comprising" used herein mean the presence or addition of at least one of other components, steps, operations and elements.

Hereinafter, with reference to the drawings an embodiment of the present inventive concept will be described in detail.

Wireless communication, especially a Bluetooth connection between a vehicle and a terminal may be frequently disconnected due to the characteristic. The operation of the connection and disconnection according to the user's intention is not a problem, but, regardless of the user's intention, when the Bluetooth connection is disconnected and the control or use of the terminal is limited due to the limitation of wireless communication or communication problems happened between a vehicle and a terminal, it may cause inconvenience of the user of the vehicle, and it may be recognized as a breakdown of the terminal or the communication module of the vehicle and thus, this may cause customer dissatisfaction.

The present inventive concept is provided for eliminating the inconvenience of the user caused by the disconnection or connection failure of a profile, through a series of connection managing processes such as the connection and the connection management of the Bluetooth profile for a vehicle.

The vehicle may have the head unit including a Bluetooth communication module as a device connecting with a terminal by Bluetooth.

Figure 1:
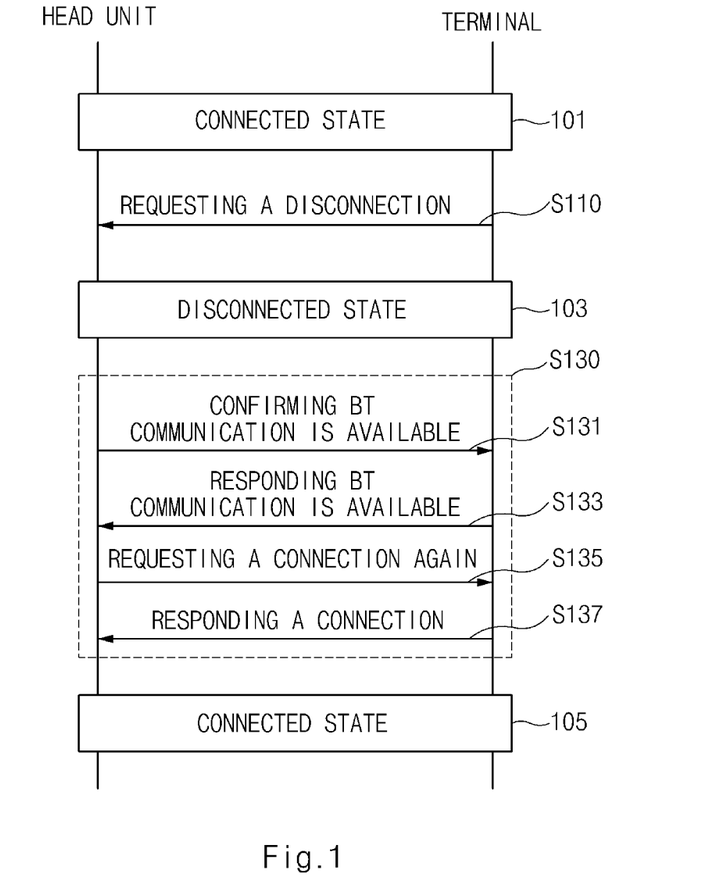
FIG. 1 is a diagram showing a process of connecting the Bluetooth in a vehicle again, when the Bluetooth disconnection request is received from a terminal, in a method for controlling a Bluetooth connection according to an embodiment of the present inventive concept.

FIG. 1 is a diagram showing a process of connecting the Bluetooth in a vehicle again, when the Bluetooth disconnection request is received from a terminal, in a method for controlling a Bluetooth connection according to an embodiment of the present inventive concept.

The disconnection of the Bluetooth may occur when the connection is disconnected by the user's intention or the terminal's error. At this time, the vehicle may not determine whether this disconnection has occurred according to the user's intention or not. And, during the actual use, even when the user does not operate, the problem of a Bluetooth disconnection may occur, and accordingly, even when the user tries to call, the user may not use the telephone function due to the disconnection of the Bluetooth.

In particular, even when there is no user's operation, the problem that the signal for disconnecting the Bluetooth connection from the smart phone is transmitted to the vehicle, may frequently occur. For example, when the Bluetooth connection is disconnected by the smart phone due to the overload of the smart phone while driving in the Bluetooth connection state, or when the smart phone is reset by an internal error (e.g., errors in battery, resource management) or an application related to the Bluetooth is turned off, the Bluetooth connection between the vehicle and the terminal may be disconnected and maintained in the disconnected state.

First, in the state which the vehicle and the terminal is connected through the Bluetooth each other (101), a request for disconnecting the Bluetooth connection may be transmitted from the terminal to the vehicle due to the above-noted reasons (e.g., overload of the smartphone, reset of the smart phone or turning off of the application) (S110) and the Bluetooth connection is disconnected (103).

In the existing Bluetooth connection and management of the vehicle and the terminal, when there is no user's operation in this situation, the disconnected state (103) is continually maintained.

However, in a method for controlling a Bluetooth connection (S130) according to the present inventive concept, when the disconnection of the Bluetooth connection is detected, the vehicle may automatically confirm or determine whether the Bluetooth communication of the terminal is available or not currently (S131).

Then, when the vehicle receives the response which the Bluetooth communication is available from the terminal which is determined to have availability of the Bluetooth communication (S133), the vehicle may automatically request the Bluetooth connection to the terminal again for the Bluetooth reconnection (S135).

Then, when the terminal and the vehicle are connected through the Bluetooth, the vehicle may receive a response indicating the establishment of a Bluetooth connection which is requested from the terminal (S137), and the terminal and the vehicle may be connected through the Bluetooth (105).

Figure 2:
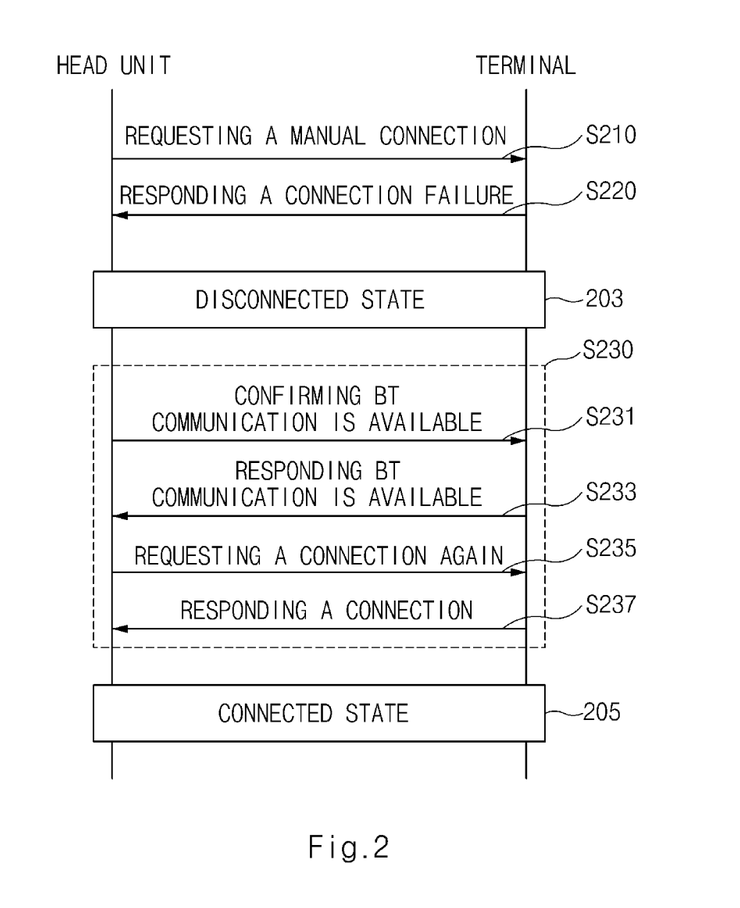
FIG. 2 is a diagram showing a process of connecting the Bluetooth in a vehicle again, when a manual Bluetooth connection is failed, in a method for controlling a Bluetooth connection according to an embodiment of the present inventive concept.

FIG. 2 is a diagram showing a process of connecting the Bluetooth in a vehicle again, when a manual Bluetooth connection is failed, in a method for controlling a Bluetooth connection according to an embodiment of the present inventive concept.

First, when the user of the vehicle requests the Bluetooth connection to other terminal which is not connected with the vehicle currently, the vehicle may disconnect the current Bluetooth connection, and request a new Bluetooth connection to the terminal (S210).

Then, when the failure of the Bluetooth connection is generated due to a communication error between the terminal requesting the new Bluetooth connection and the vehicle (e.g., due to compatibility problem for inter-communication) (S220), because the Bluetooth connection of the terminal and the vehicle which was connected before the manual connection request is already disconnected, the Bluetooth connection of the vehicle and the terminal may become the disconnected state (203).

In the existing Bluetooth connection and management of the vehicle and the terminal, when there is no user's operation in this situation, the disconnected state (203) is continually maintained.

However, in a method for controlling a Bluetooth connection (S230) according to the present inventive concept, when the disconnection of the Bluetooth connection is detected, the vehicle automatically may confirm or determine whether the Bluetooth communication of the terminal is available or not currently (S231).

Then, when the vehicle receives a response indicating that the Bluetooth communication is available from the terminal which is confirmed or determined to have the availability of the Bluetooth communication (S233), the vehicle may automatically request the Bluetooth connection to the terminal again for the Bluetooth reconnection (S235).

Then, when the terminal and the vehicle are connected through the Bluetooth, the vehicle may receive a response indicating the establishment of the Bluetooth connection which is requested from the terminal (S237), and the terminal and the vehicle may be connected through the Bluetooth (205).

Figure 3:
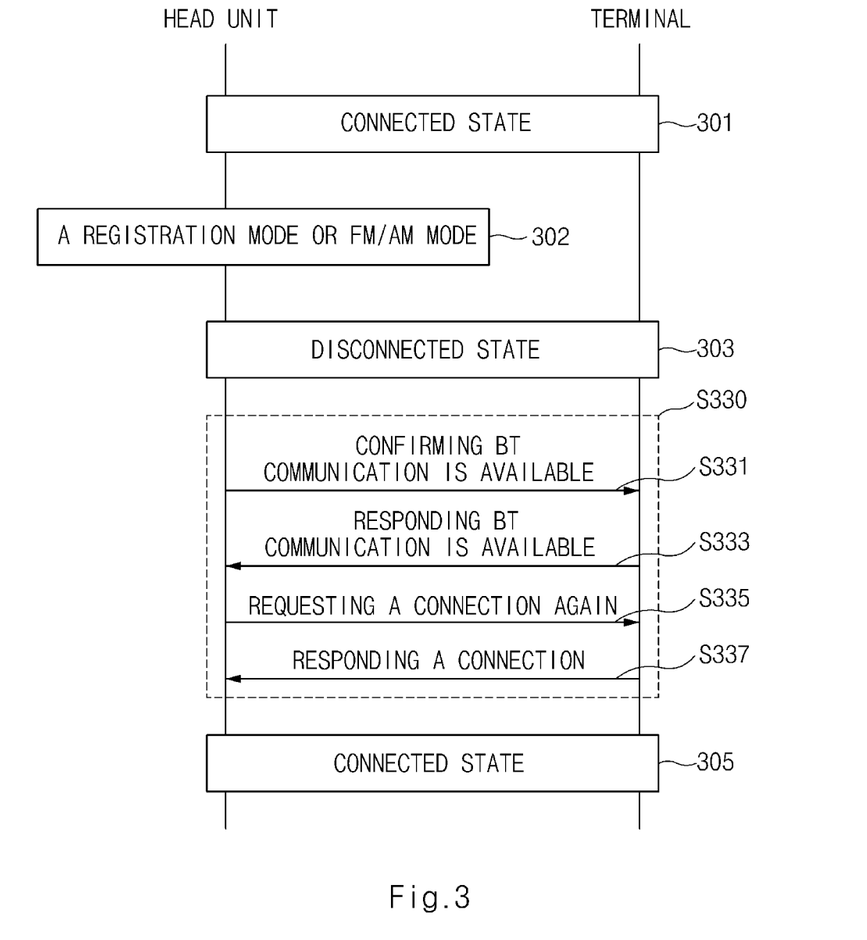
FIG. 3 is a diagram showing a process of connecting the Bluetooth in a vehicle again, in case of the cancellation of a new device registration or the switch to other mode such as FM/AM, in a method for controlling a Bluetooth connection according to an embodiment of the present inventive concept.

FIG. 3 is a diagram showing a process of connecting the Bluetooth in a vehicle again, in case of the cancellation of a new device registration or the switch to other mode such as FM/AM, in a method for controlling a Bluetooth connection according to an embodiment of the present inventive concept.

In order to register a new terminal for the Bluetooth connection, the mode of the vehicle may be changed to a terminal register mode (302), instead of a Bluetooth connection mode (301). In this case, because the previous Bluetooth connection of the terminal with the vehicle has to be disconnected, the Bluetooth connection of the vehicle and the terminal may become the disconnected state (303). Here, even when it is not the terminal register mode but a radio receiving mode (302), the Bluetooth connection of the vehicle and the terminal may become the disconnected state (303).

Specifically, when the terminal register mode is cancelled while progressing the terminal register mode in order to register the terminal to the vehicle, the disconnected state of the Bluetooth connection may be maintained, and when the vehicle enters into the terminal register mode and the vehicle drives, the disconnected state of the Bluetooth connection may be maintained while the terminal register mode is cancelled. Even when the vehicle operates the head unit as the radio receiving mode in order to receive a radio in the state which the Bluetooth is connected, the Bluetooth connection may be disconnected and this disconnected state may be maintained.

In the existing Bluetooth connection and management of the vehicle and the terminal, when there is no user's operation in this situation, the disconnected state (303) is continually maintained.

However, in a method for controlling a Bluetooth connection (S330) according to the present inventive concept, when the disconnection of the Bluetooth connection is detected, the vehicle may automatically confirm or determine whether the Bluetooth communication of the terminal is available or not currently (S331).

Then, when the vehicle receives a response indicating the Bluetooth communication is available from the terminal which is confirmed or determined to have the availability of the Bluetooth communication (S333), the vehicle may automatically request a Bluetooth connection to the terminal again for the Bluetooth reconnection (S335).

Then, when the terminal and the vehicle are connected through the Bluetooth, the vehicle may receive a response indicating the establishment of a Bluetooth connection which is requested from the terminal (S337), and the terminal and the vehicle may be connected through the Bluetooth (305).

Figure 4:
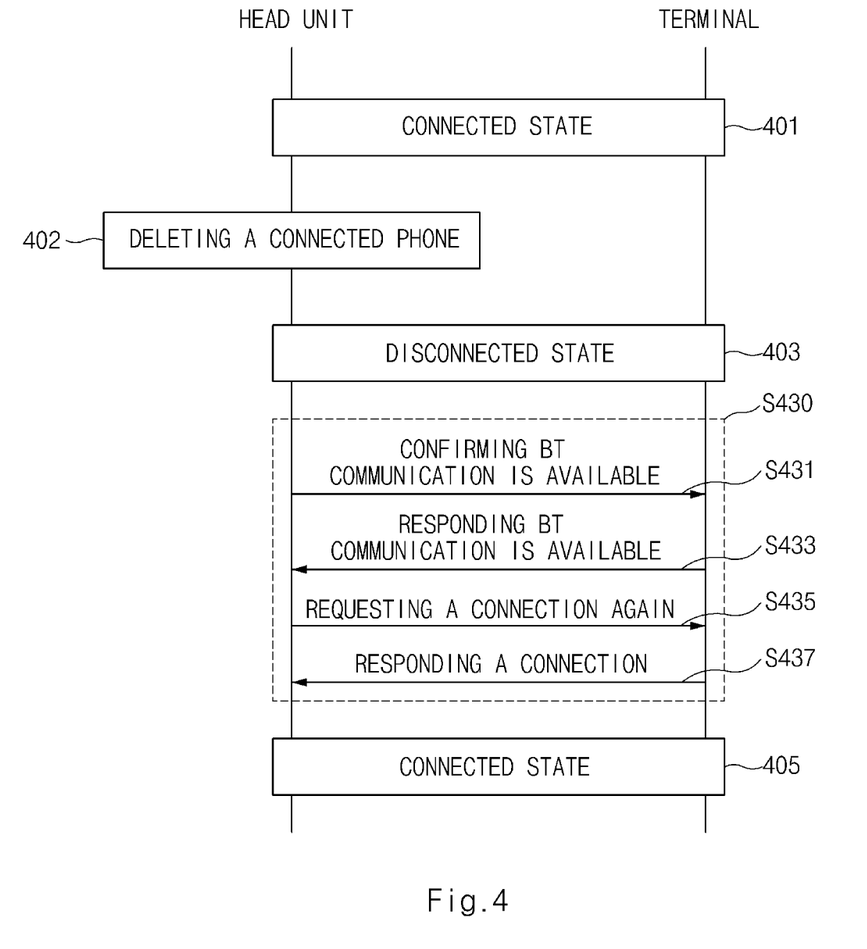
FIG. 4 is a diagram showing a process of connecting the Bluetooth in a vehicle again, when the currently connected terminal is deleted in a head unit or the deletion is failed, in a method for controlling a Bluetooth connection according to an embodiment of the present inventive concept.

FIG. 4 is a diagram showing a process of connecting the Bluetooth in a vehicle again, when the currently connected terminal is deleted in a head unit or the deletion is failed, in a method for controlling a Bluetooth connection according to an embodiment of the present inventive concept.

When the user of the vehicle deletes the currently connected (401) terminal by the Bluetooth in the terminal list registered in the vehicle or tries to delete, but the deletion may be failed (402), when the deletion of the terminal in the list is performed, the previously Bluetooth connection may become the disconnected state (403). And, even when the deletion of the terminal in the list is failed, the previously connected Bluetooth connection may become the disconnected state (403).

In the existing Bluetooth connection and management of the vehicle and the terminal, when there is no user's operation in this situation, the disconnected state (403) is continually maintained.

However, in a method for controlling a Bluetooth connection (S430) according to the present inventive concept, when the disconnection of the Bluetooth connection is detected, the vehicle may automatically confirm or determine whether the Bluetooth communication of the terminal is available or not currently (S431).

Then, when the vehicle receives a response indicating the Bluetooth communication is available from the terminal which is confirmed or determined to have the availability of the Bluetooth communication (S433), the vehicle may automatically request the Bluetooth connection to the terminal again for the Bluetooth reconnection (S435).

Then, when the terminal and the vehicle are connected through the Bluetooth, the vehicle may receive a response indicating the establishment of a Bluetooth connection which is requested from the terminal (S437), and the terminal and the vehicle may be connected through the Bluetooth (405).

Figure 5:
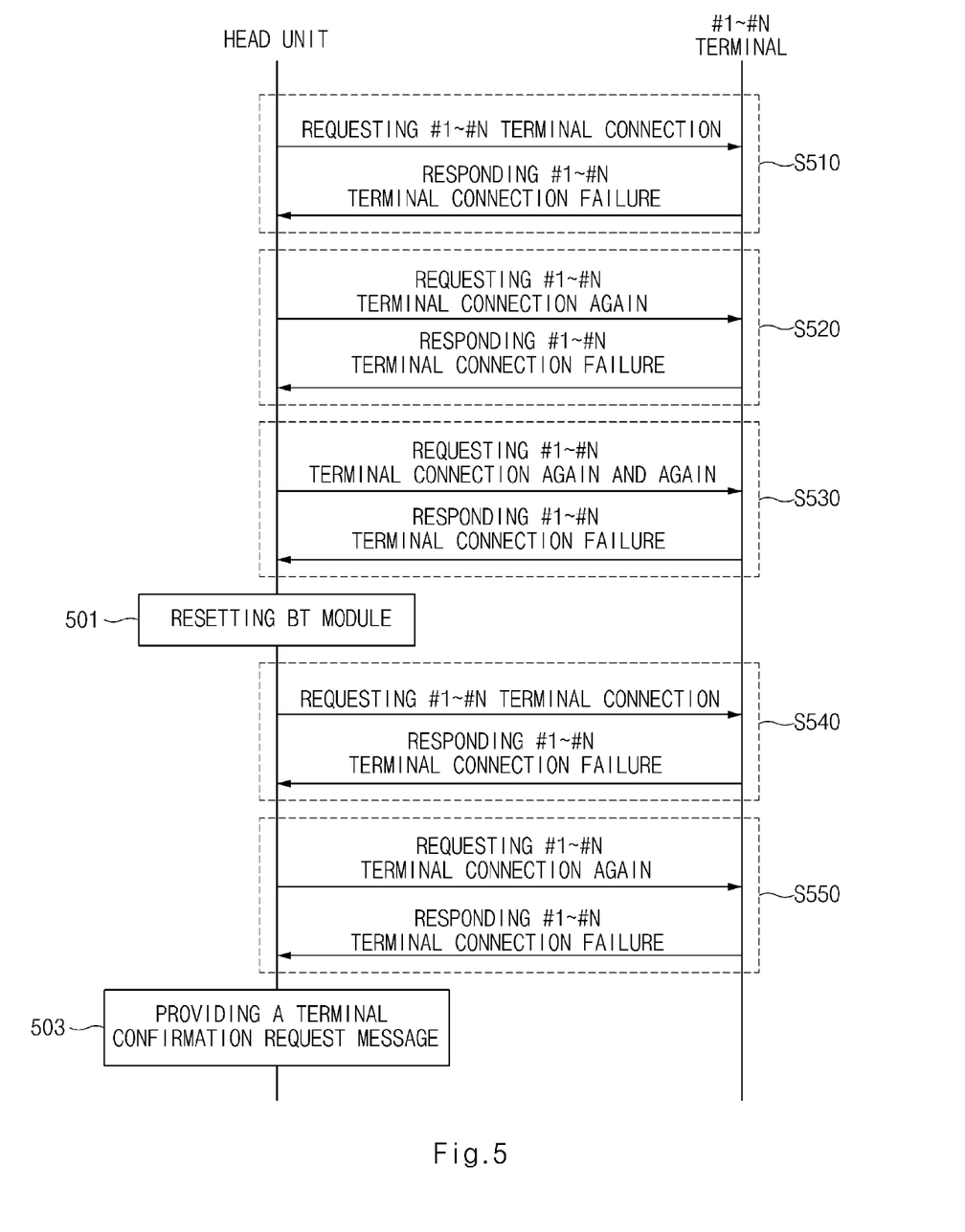
FIG. 5 is a diagram showing a process of connecting the Bluetooth in a vehicle again, when the connection with the terminal of a paring list is failed three times in a row, in a method for controlling a Bluetooth connection according to an embodiment of the present inventive concept.

FIG. 5 is a diagram showing a process of connecting the Bluetooth in a vehicle again, when the connection with the terminal of a paring list is failed three times in a row, in a method for controlling a Bluetooth connection according to an embodiment of the present inventive concept.

The vehicle may search a currently Bluetooth connection available terminal in a terminal list registered in the vehicle and may try or attempt a Bluetooth connection (S510, S520, S530). At this time, when a problem, for example, the Bluetooth of the terminal is not activated or the terminal is turned off, occurs in the terminal, the terminal and the vehicle may not be connected by the Bluetooth. When connection is consistently or mostly failed, it may be the case in which a problem occurs in the terminal itself, or may be the case in which a problem occurs in Bluetooth software of the Bluetooth communication module of the head unit provided in the vehicle.

In this case, in the existing Bluetooth connection and management of the vehicle and the terminal, when there is no user's operation in this situation, the disconnected state is continually maintained.

However, in a method for controlling a Bluetooth connection according to the present inventive concept, the Bluetooth connection may be requested by a terminal in the terminal list registered for the Bluetooth connection (S510), but when the Bluetooth connection is not established, the Bluetooth connection may be attempted by repeating the same request of the Bluetooth connection twice or more (S520, S530).

And, even after requesting and attempting of the Bluetooth connection are repeated three times (S510, S520, S530), when the Bluetooth connection of the vehicle and the terminal is not established, the Bluetooth module provided in the vehicle may be reset (501).

Then, the vehicle may request the Bluetooth connection (S540), and nevertheless, when the Bluetooth connection is not established, the Bluetooth connection may be attempted by repeating the same request of the Bluetooth connection once more (S550).

And, even after requesting and attempting Bluetooth connection are repeated twice after resetting the module (S540, S550), when the Bluetooth connection of the vehicle and the terminal is not established, it may be determined that it is not a problem of the Bluetooth module provided in the vehicle, and the message requesting a confirmation may be provided to the user of the vehicle so as to confirm the Bluetooth activation state of the terminal through a display device provided in the vehicle (503).

Figure 6:
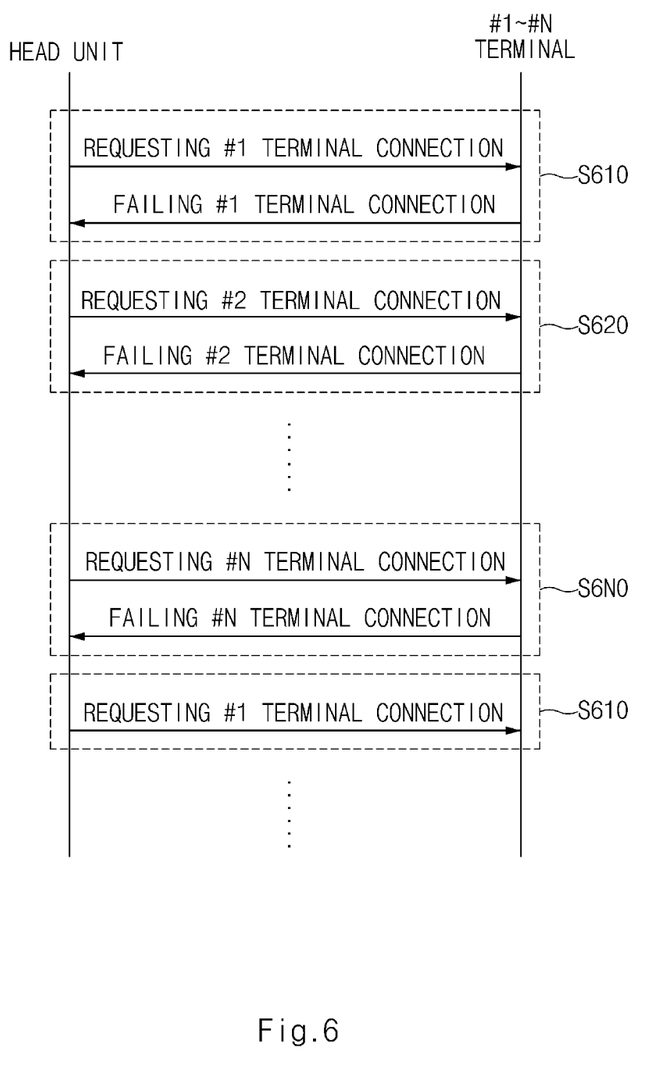
FIG. 6 is a diagram showing a process of shortening the time to connect the registered terminals, in a method for controlling a Bluetooth connection according to an embodiment of the present inventive concept.

FIG. 6 is a diagram showing a process of shortening the time to connect the registered terminals, in a method for controlling a Bluetooth connection according to an embodiment of the present inventive concept.

The dissatisfaction with the time to connect the terminal possessed by the user of the vehicle with the vehicle is gradually increased. As the time to connect the Bluetooth connection becomes longer, the user may feel as if the Bluetooth connection would be disconnected or there is dissatisfaction over the unavailability of the telephone function when the user wants to urgently call since the Bluetooth connection of the vehicle and the terminal is slowly connected.

In particular, in the existing Bluetooth connection and management of the vehicle and the terminal, the vehicle requests the Bluetooth connection to one terminal, waits for a response to the request, and when the Bluetooth connection is not established, the vehicle requests the Bluetooth connection and waits for the response over and over again, and thus it takes more than 5 minutes. As a result, when the vehicle requests the connection to all of the terminals registered in the vehicle in a list, including a fifth terminal to be connected fifth among the registered terminals in the list, the user of the vehicle can use the Bluetooth connection of the fifth terminal and the vehicle after the user gets in the vehicle and 5 minutes is elapsed.

However, in order to meet user's needs, the method for controlling a Bluetooth connection according to the present inventive concept, may shorten the time to connect a registered terminal with the vehicle by the Bluetooth.

For this, when the Bluetooth connection is requested to terminals in the terminal list registered to the vehicle, the Bluetooth connection may be requested from a highest priority terminal of the registered terminals in order of priority, but duplicate attempts for the Bluetooth connection may be eliminated for each of the registered terminal depending on the priority and it may be attempted just once (S610, S620, . . . to S6N0), and it may be circulated or repeated. As a result, the time to request the Bluetooth connection for all of the terminals registered in the list may be shortened.

Also, in the above-described method for controlling the Bluetooth connection according to the present inventive concept, when a plurality of terminals are registered in the list registered in the vehicle, before automatically requesting the Bluetooth connection again, the step of confirming whether the Bluetooth connection of the terminal is available or not may firstly confirm or determine whether the Bluetooth connection of the terminal is available or not to the terminal which was connected with the vehicle by the Bluetooth immediately before disconnecting the Bluetooth connection.

Then, when the Bluetooth communication of the terminal is impossible or the Bluetooth connection of the vehicle and the terminal is not established, it may confirm or determine whether the Bluetooth communication is available from the highest priority terminal preset in the terminal list registered in the vehicle to a low priority terminal in order.

When the terminal is deleted in the terminal list registered in the vehicle, if the deleted terminal is the terminal which was connected to the vehicle immediately before the Bluetooth connection is disconnected, the vehicle may instantly confirm or determine whether the Bluetooth communication is available from the highest priority terminal preset in the terminal list registered in the vehicle in order.

After all, a method for controlling a Bluetooth connection according to an embodiment of the present inventive concept can automatically recover the disconnected Bluetooth connection quickly, in the situation in which the user can't use the Bluetooth due to the unexpected disconnection of the Bluetooth. As a result, the user can always use the user's terminal in the vehicle through the Bluetooth connection safely.

In the above description, the present inventive concept has been described through specific examples, but it may be well understood that various modifications can be made without departing from the scope of the present inventive concept. Therefore, the scope of the present inventive concept is not limited to the above described embodiments, and it should be defined by the appended claims and their equivalents. When taking the foregoing description into account, if the modifications and variations of the present inventive concept fall within the following claims and their equivalents, then it is construed that the present inventive concept includes these modifications and variations.

What is claimed is:

1. A method for controlling a Bluetooth connection, comprising steps of:

connecting a terminal with a vehicle through a Bluetooth connection;

disconnecting the Bluetooth connection according to a disconnection request of the terminal;

automatically determining whether a Bluetooth communication of the terminal is available or not in the vehicle, when the disconnection of the Bluetooth connection is detected, wherein the step of automatically determining whether a Bluetooth communication of the terminal is available or not includes determining whether the Bluetooth communication is available or not to a previous terminal which has been connected immediately before the step of disconnecting the Bluetooth connection, and when the Bluetooth connection between the previous terminal and the vehicle is not established, determining whether the Bluetooth communication is available from a highest priority terminal of terminals registered in a terminal registration mode for the Bluetooth connection of the vehicle in order of priority, by eliminating duplicate attempts of the Bluetooth requests;

requesting the Bluetooth connection again from the vehicle to the terminal, when receiving from the terminal a response indicating the Bluetooth communication is available; and connecting the vehicle and the terminal by requesting the Bluetooth connection again.

\* \* \* \* \*